US008837926B2

(12) United States Patent
Deering

(10) Patent No.: US 8,837,926 B2
(45) Date of Patent: Sep. 16, 2014

(54) REFLECTIVE PHOTOGRAPHY

(76) Inventor: John Joseph Deering, Lakewood, OH (US)

(*) Notice: Subject to any disclaimer, the term of this patent is extended or adjusted under 35 U.S.C. 154(b) by 803 days.

(21) Appl. No.: 12/924,757

(22) Filed: Oct. 5, 2010

(65) Prior Publication Data

US 2012/0081555 A1    Apr. 5, 2012

(51) Int. Cl.
*G03B 15/00*    (2006.01)
(52) U.S. Cl.
USPC .................................. 396/3; 396/1
(58) Field of Classification Search
USPC ........................................... 396/1–5
See application file for complete search history.

(56) References Cited

U.S. PATENT DOCUMENTS

| 4,283,760 A * | 8/1981 | Kita et al. ................. 710/31 |
| 5,105,306 A | 4/1992 | Ohala |
| 7,008,063 B2 | 3/2006 | Porter et al. |
| 7,336,422 B2 | 2/2008 | Dunn |
| 7,680,401 B1 * | 3/2010 | Adelstein .................. 396/1 |
| 8,233,785 B1 * | 7/2012 | Surma et al. .............. 396/1 |
| 2003/0206735 A1 * | 11/2003 | Saigo et al. .............. 396/1 |

* cited by examiner

*Primary Examiner* — Albert Wong

(57) ABSTRACT

Reflective Photography produces prints that make the objects photographed completely unrecognizable. A thin sheet of undulating polyester film is photographed. The objects placed in front and indirectly photographed produce an impressionistic print.

1 Claim, 6 Drawing Sheets

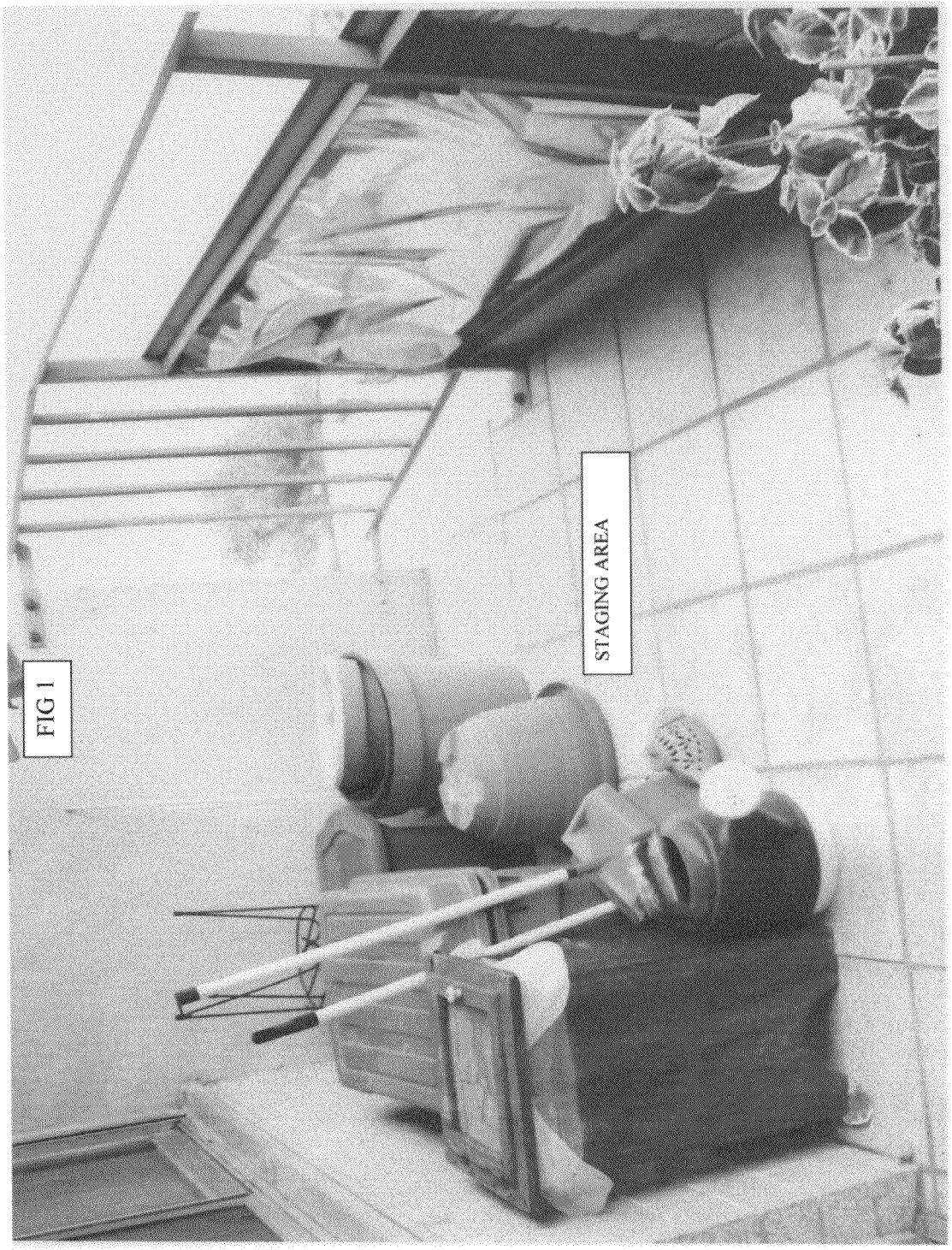

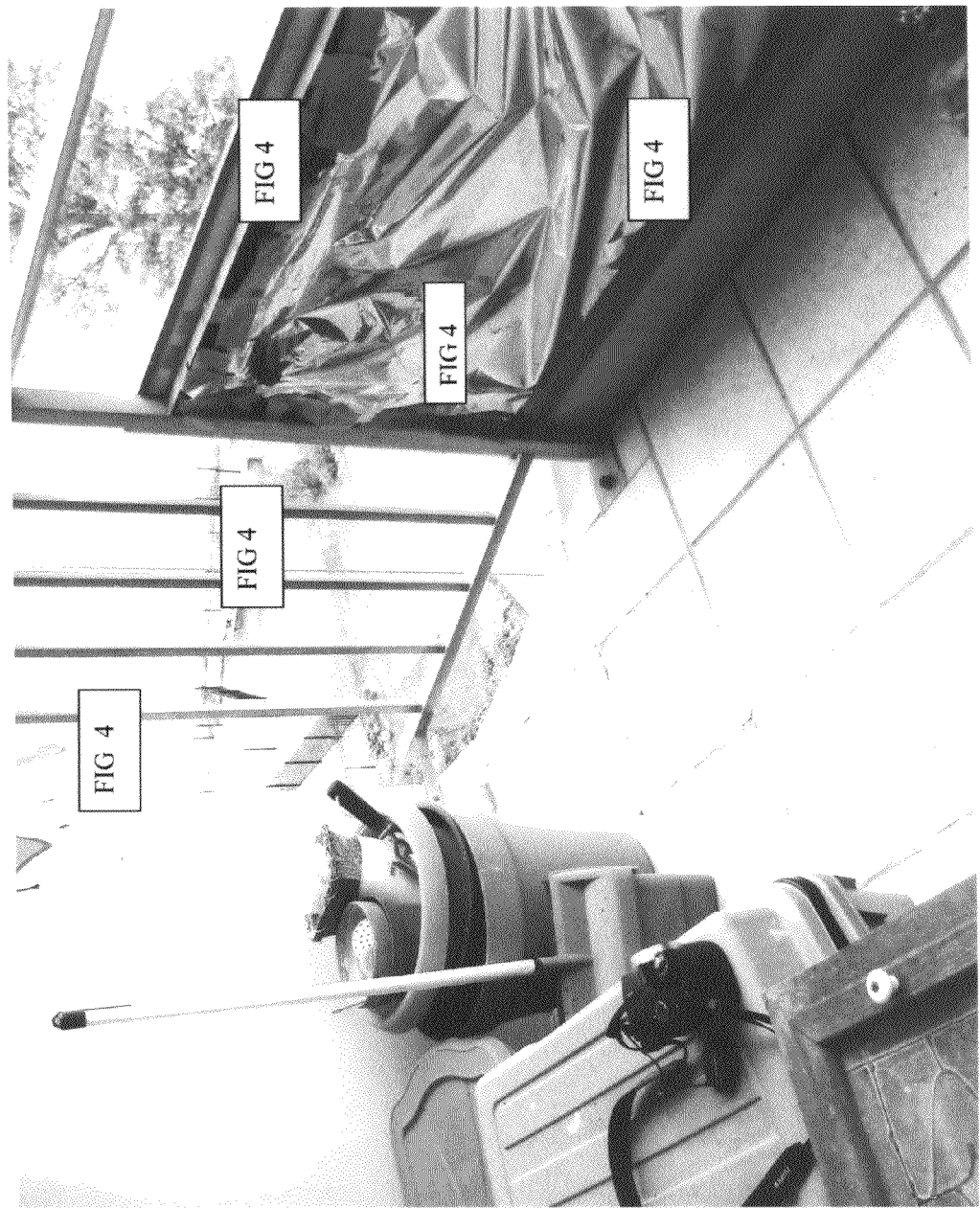

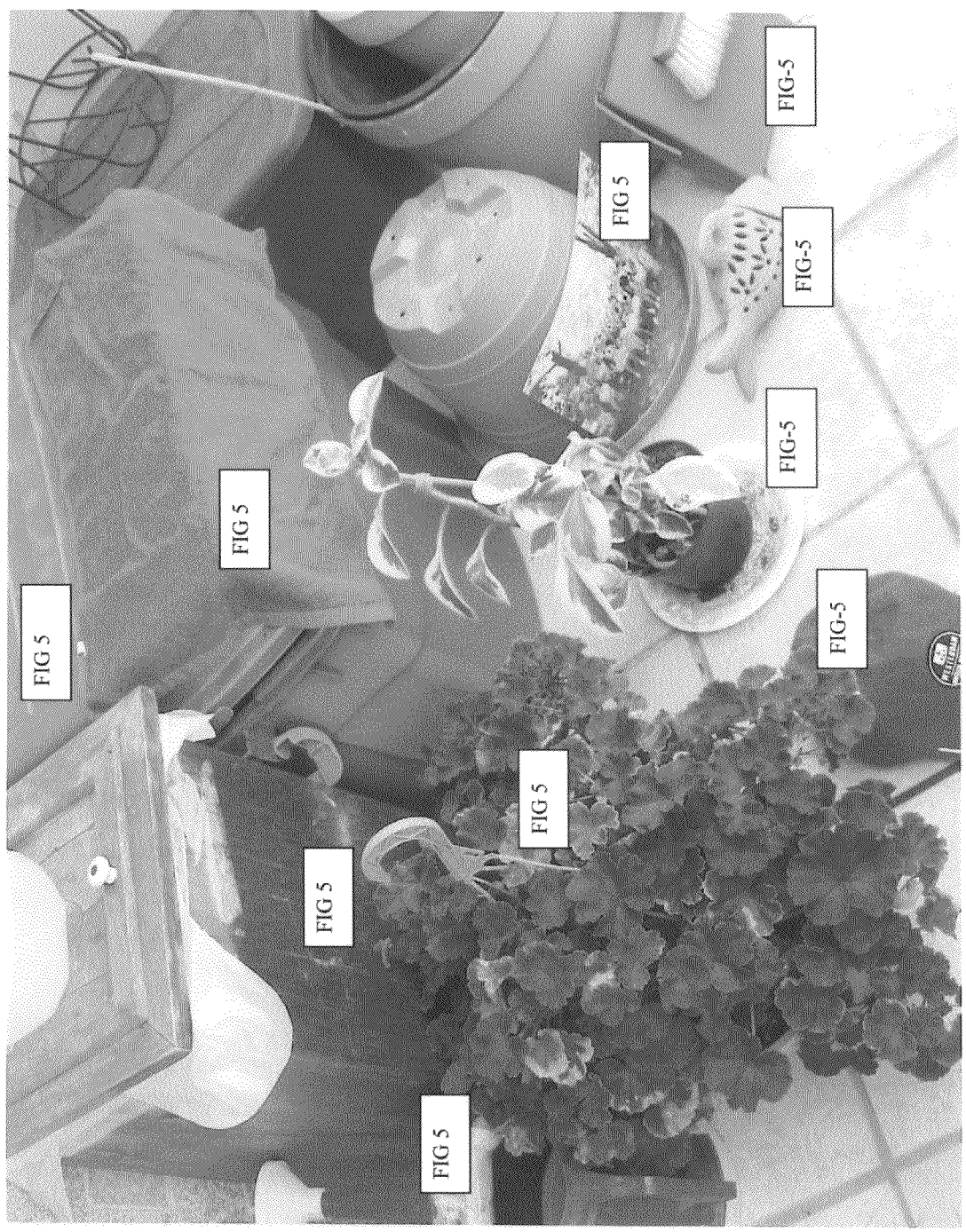

REFLECTIVE PHOTOGRAPHY

STATEMENT REGARDING FEDERALLY SPONSORED RESEARCH or DEVELOPMENT

The inventor is not employed nor associated with any federally sponsored research and development organization, nor are there any co-inventors or businesses, charitable or otherwise, involved in this patent application.

CROSS-REFERENCE TO RELATED APPLICATIONS

Not Applicable

REFERENCE TO SEQUENCE LISTING

Not Applicable

SPECIFICATION

The invention named in this application can only be described as something that can be produced in various Staging Areas suitable for photography. In other words, one size or location does not fit all situations. The Staging Area can be either indoors or outdoors. Natural light out of doors generally would be sufficient during the day. However, while photographing indoors it undoubtedly would require artificial lighting to suit the photographer's needs, all based on the size of the Staging Area chosen for this activity.

Basic are the following items needed to produce Reflective Photographs: A digital camera, of any type or model, not a movie camera; a table, a sturdy chest or plastic storage container on which to place the digital camera, or a tripod. A sheet of high performance, clear polyester film or similar sheeting. A solid wall to which the film sheet is loosely attached with duct tape that fits the size of the film sheet where the wall color is immaterial.

When photographing indoors, a fan is required of proper strength set at a place appropriate to create undulating movement of the polyester film. When photographing out of doors, photography would generally require a warm day rather than a cold day on which there was sufficient wind coming from a proper direction to pass under the film sheet to produce the desired undulating effect.

The target material that will be indirectly photographed consists of a variety of household objects; i.e., a watering can, clay or plastic pots containing flower plants with solid or multi-colored leaves, a dust pan and broom, dish towels, multi-colored seat cushions, a baseball cap; gloves, ceramic figurine, and any other object or objects similar in size or shape to those named that are generally multi-colored. Solid colored objects can also be intermingled whenever there is sufficient wind effect to distort their image. The target material used can be two dimensional or three dimensional.

Keep in mind that larger staging areas could contain larger target material. What is important here is that the target objects be such that their image is distorted on the undulating film when the picture is taken. I have not ventured into testing various sized staging areas, only the one used in this patent application.

The polyester film sheet is attached with pieces of duct tape to the various sides of the solid back wall. The tape attachment is spaced to permit a strong flow of air from the wind source available, allowing the passage of air under the film to produce an undulating effect on the film sheet. With a proper location out of doors, on a porch or deck that has an open railing next to the attached film sheet, the wind will generally provide sufficient air movement under the film sheet to keep it undulating. If no wind, then no results as desired. In my illustration the target objects named herein are placed a short distance, twelve to twenty-four inches, in front of the film with the digital camera placed directly above and to the rear of the array of objects.

With a proper flow of air coming in through the railing a picture is taken of the undulating view that is projected from the target objects as they appear on the undulating film. The resulting figure will show a distorted, abstract, unidentifiable view of the target objects. A variety of pictures will result by rearranging the same target objects or adding other target objects and taking additional pictures. The results are phenomenal.

BACKGROUND OF THE INVENTION

The field of endeavor is entirely photography using a digital camera. Prior to my development of Reflective Photography an artist would generally be involved for a considerable length of time, first to formulate an idea about producing a result that would be representational of nothing ever seen before in nature. e.g., an abstract painting. A laborious process followed in which selected colors of paint would be applied one at a time by one method or another to a canvas or other material. From a number of these paintings, copies of which I have retained, hardly a one of them can match the subliminal images that can be produced almost instantly with a digital camera in a Staging Area, along with the simple household objects that I have used in my work. What has gone before is nothing more than primitive art in abstract painting. Others, to obtain abstract images have placed wet paint on a canvas laying on a floor and let an animal, cat or dog, walk around on the wet surface, or use a snake to crawl over the surface to produce odd, abstract images. What I am doing with Reflective Photography will displace the laborious, unattractive activity of these artists for another reason and that is, my photographs can be enlarged to almost any dimension once the image is removed from the digital camera and stored in a computer.

To my knowledge, there are no references to specific documents, which are related to my invention as I am the first person, apparently, who has ever attempted the use of REFLECTIVE PHOTOGRAPHY.

BRIEF SUMMARY of the INVENTION

Reflective Photography will bring this form of artistic progress into the twenty-first century by utilizing a device, the digital camera which can very quickly produce a product that transcends what has gone before in abstract art. The invention of the picture camera more than one hundred fifty years ago caused portrait painting to be limited to the very wealthy or to senior officials in stable governments. No one else could afford the time spent while a painter took days and weeks to produce a finished product. Now, Reflective Photography will displace or reduce the popularity of another branch of art, abstract painting. Cost alone will also serve to reduce the production of laborious, unattractive abstract painting.

Photography itself has brought artistic development and display out of the museums and made it a source of enjoyment for people at all financial levels. My invention will continue that progress of bringing art enjoyment to a greater number of people.

BRIEF DESCRIPTION OF THE SEVERAL VIEWS OF THE DRAWING (PHOTOGRAPHS)

A petition is hereby made to submit three sets of photographs in lieu of drawings or black and white photographs in this Utility Patent Application. An additional fee of $130 is included under 37 CFR §1.17(h), Fee code 1464. Abstract color photography is at the heart of this patent application. The objects to be indirectly photographed must be those that show a variety of color and ultimate distortion. The resultant figures produced by Reflective Photography have no essence without a great variety of color. Drawings cannot begin to enable a person to comprehend where and how the resultant pictures were produced. And an undulating film sheet cannot possibly be drawn to enable someone to comprehend its potential use nor can a black and white picture produce intelligible results.

A further request is made to provide landscape shaped photos. A spread is needed to portray the Staging Area (FIG. 1) in its best view as well as some of the other scenes. The labeling would be more obtrusive in FIG. 5 had it been shown in portrait form.

This invention patent request requires color pictures to discern a superior level of the finished product. See FIG. 6. A submission for patent approval could not possibly depict this process clearly in black and white or with drawings. The purpose of this invention is to eliminate the need for drawings rather than utilize them.

Views of the Reflective Photography Staging Area and some other necessary paraphernalia:

FIG. 1. The entire Staging Area is shown laterally.

FIG. 2. The undulating polyester film screen (2) is shown in a frontal view attached to a solid backing wall (2).

FIG. 3. The location of the digital camera (3).

FIG. 4 The railing area (4) through which a strong air flow filters in to enter between the polyester film screen and the backing wall. Also shown is the duct tape (4) attached to the polyester film screen and the backing wall.

FIG. 5. The types and location of various objects to be used in the pictures. Items shown are: potted plants, ball cap, watering can, rubbish container, dish cloth, ceramic figurine, colorful print, plastic dust pan.

FIG. 6. An abstract resulting figure of Reflective Photography. Phenomenal!

The best mode of carrying out my invention is to display the work in such a way that the public will recognize its enduring artistic value.

DETAILED DESCRIPTION of the INVENTION

The discovery was purely accidental of this all new method of digital camera use that I have subsequently named Reflective Photography. There was no development period whatsoever. To explain, a sheet of polyester film had come loose from the solid wall backing in what has become the Staging Area on the deck of my residence, see FIG. 1. This particular film sheet, one of four pieces, 25X50 inches, came loose shortly after its installation. To keep the film sheet from separating from the backing wall, I attached to the backing wall and the film sheet pieces of duct tape, (FIG. 4) at intervals along the various sides of the film sheet.

From time-to-time a strong breeze would blow through the railing, seen in FIG. 4. The resultant air would infiltrate under the loose film sheet FIG. 2 causing it to undulate.

Upon noticing this phenomenon, I placed a digital camera, FIG. 3 on a plastic container approximately four feet in front of the undulating film sheet. The resulting picture, see FIG. 6 shows the results—AN ALL NEW PROCESS OF PHOTOGRAPHY WAS BORN! The picture on FIG. 6 even has a name, Cypress.

The development of the Staging Area was very easy for this process as almost all necessary parts were in place therein on the deck of my residence. It was just a matter of placing a digital camera, FIG. 3 in a location that would enable me to determine what would be the results of a photo taken of this undulating film screen.

Ultimately, a color printer attached to a computer is necessary to produce the figure or figures once the digital images are stored in a computer from this method of photography. Further, it requires a person capable of setting up the Staging Area with all the components already mentioned, a person who is capable of using a digital camera, a computer and a color printer. The resultant figures can be produced on almost any type of paper from plain ordinary copy paper to various types of glossy photo paper.

The invention claimed is:

1. A method of taking an abstract artistic photograph comprising the steps of:
    placing a sheet of reflective polyester film within an area wherein the film includes ripples and folds;
    loosely attaching the film to a railing or backing wall on the edges of the film while allowing the film to move while being restrained and maintaining the ripples and folds;
    introducing an unstable flow of air, between the film and the railing or backing wall, of sufficient strength and motion to cause the film to undulate;
    placing an object in front of the film;
    placing a digital camera on a rigid surface approximately 4 feet in front of the film to capture an image of the film;
    setting the duration of exposure on the camera wherein the duration is sufficiently long with respect to the movement of the film such that the image of the object captured by the camera via the film is not recognizable; and
    capturing an image of the film, and not the object, by the digital camera.

* * * * *